(12) United States Patent
Scott

(10) Patent No.: US 8,635,213 B2
(45) Date of Patent: *Jan. 21, 2014

(54) SYSTEM AND METHOD FOR LINKING AD TAGGED WORDS

(75) Inventor: Sherryl Lee Lorraine Scott, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/480,609

(22) Filed: May 25, 2012

(65) Prior Publication Data

US 2012/0232996 A1    Sep. 13, 2012

Related U.S. Application Data

(63) Continuation of application No. 12/395,288, filed on Feb. 27, 2009, now Pat. No. 8,214,357.

(51) Int. Cl.
*G06F 17/30* (2006.01)

(52) U.S. Cl.
USPC ........ 707/726; 707/707; 707/804; 455/456.6; 455/457

(58) Field of Classification Search
USPC ................ 707/726, 707, 804; 455/456.6, 457
See application file for complete search history.

(56) References Cited

U.S. PATENT DOCUMENTS

| | | | |
|---|---|---|---|
| 7,284,008 B2 | 10/2007 | Henkin et al. | |
| 7,769,745 B2 * | 8/2010 | Naaman et al. | 707/713 |
| 7,930,208 B2 * | 4/2011 | Sharman et al. | 705/14.53 |
| 8,214,357 B2 | 7/2012 | Scott | |
| 8,335,830 B2 * | 12/2012 | Jablokov et al. | 709/206 |
| 2002/0112237 A1 | 8/2002 | Kelts | |
| 2002/0137507 A1 | 9/2002 | Winkler | |
| 2002/0138345 A1 | 9/2002 | Dickson et al. | |
| 2002/0194061 A1 | 12/2002 | Himmel et al. | |
| 2003/0017822 A1 | 1/2003 | Kissner et al. | |
| 2005/0039136 A1 | 2/2005 | Othmer | |
| 2006/0253437 A1 | 11/2006 | Fain et al. | |
| 2007/0100690 A1 | 5/2007 | Hopkins | |
| 2007/0240079 A1 | 10/2007 | Flynt et al. | |

(Continued)

FOREIGN PATENT DOCUMENTS

| | | |
|---|---|---|
| EP | 2026215 | 2/2009 |
| EP | 2026215 A1 | 2/2009 |

(Continued)

OTHER PUBLICATIONS

"U.S. Appl. No. 12/395,288, Advisory Action mailed Nov. 4, 2011", 3 pgs.

(Continued)

*Primary Examiner* — Debbie Le
(74) *Attorney, Agent, or Firm* — Schwegman, Lundberg & Woessner, P.A.

(57) ABSTRACT

A method and apparatus for providing advertisement on a mobile communication device is disclosed herein. In one embodiment, a primary keyword and at least one secondary keyword are identified in a list or a body of text at the mobile communication device. A compound keyword is formed from the primary keyword and the at least one secondary keyword. At least one advertising resource link is associated with the formed compound keyword, and the formed compound keyword is visually distinguished.

20 Claims, 11 Drawing Sheets

(56) References Cited

U.S. PATENT DOCUMENTS

| | | |
|---|---|---|
| 2007/0293247 A1 | 12/2007 | Bhat et al. |
| 2008/0268772 A1 | 10/2008 | Linnamaki et al. |
| 2008/0268876 A1 | 10/2008 | Gelfand et al. |
| 2009/0076917 A1* | 3/2009 | Jablokov et al. ............ 705/14 |
| 2009/0077497 A1 | 3/2009 | Cho et al. |
| 2009/0099906 A1 | 4/2009 | Kirley et al. |
| 2009/0123899 A1 | 5/2009 | Bates |
| 2009/0198579 A1 | 8/2009 | Lewis et al. |
| 2009/0305731 A1 | 12/2009 | Kim |
| 2010/0064007 A1 | 3/2010 | Randall |
| 2010/0070385 A1 | 3/2010 | Wassingbo et al. |
| 2010/0223279 A1 | 9/2010 | Scott |
| 2010/0279667 A1* | 11/2010 | Wehrs et al. ............ 455/414.1 |
| 2011/0035662 A1 | 2/2011 | King et al. |

FOREIGN PATENT DOCUMENTS

| | | |
|---|---|---|
| WO | WO-0213552 | 2/2002 |
| WO | WO-0213552 A2 | 2/2002 |
| WO | WO-2008084211 | 7/2008 |
| WO | WO-2008084211 A2 | 7/2008 |

OTHER PUBLICATIONS

"U.S. Appl. No. 12/395,288, Final Office Action mailed Aug. 30, 2011", 9 pgs.

"U.S. Appl. No. 12/395,288, Issue Notification mailed Jun. 15, 2012", 1 pg.

"U.S. Appl. No. 12/395,288, Non Final Office Action mailed Apr. 18, 2011", 7 pgs.

"U.S. Appl. No. 12/395,288, Notice of Allowance mailed Mar. 5, 2012", 8 pgs.

"U.S. Appl. No. 12/395,288, Response filed Jun. 28, 2011 to Non Final Office Action mailed Apr. 18, 2011", 11 pgs.

"U.S. Appl. No. 12/395,288, Response filed Oct. 20, 2011 to Final Office Action mailed Aug. 30, 2011", 11 pgs.

"U.S. Appl. No. 12/395,288, Response filed Nov. 29, 2011 to Final Office Action mailed Aug. 30, 2011", 11 pgs.

"Canadian Application Serial No. 2,694,563, Office Action mailed Oct. 29, 2012", 3 pgs.

"Canadian Application Serial No. 2,694,563, Response filed Apr. 26, 2013 to Office Action mailed Oct. 19, 2012", 11 pgs.

"Chinese Application Serial No. 201010124340.7, Office Action mailed Dec. 7, 2011", w/English Translation, 10 pgs.

"Chinese Application Serial No. 201010124340.7, Office Action mailed Jun. 21, 2012", w/English Translation, 8 pgs.

"Chinese Application Serial No. 201010124340.7, Office Action mailed Sep. 28, 2012", 4 pgs.

"Chinese Application Serial No. 201010124340.7, Response filed Apr. 20, 2012 to Office Action mailed Dec. 7, 2011", w/English Claims, 17 pgs.

"Chinese Application Serial No. 201010124340.7, Response filed Sep. 6, 2012 to Office Action mailed Jun. 21, 2012", w/English claims, 8 pgs.

"European Application Serial No. 09154041.9, European Search Report mailed Aug. 5, 2009", 8 pgs.

"European Application Serial No. 09154041.9, First Office Action mailed Feb. 9, 2010", 5 pgs.

"European Application Serial No. 09154041.9, Response filed Jan. 24, 2011 to Second Office Action mailed Sep. 24, 2010", 12 pgs.

"European Application Serial No. 09154041.9, Response filed Jun. 9, 2010 to First Office Action mailed Feb. 9, 2010", 15 pgs.

"European Application Serial No. 09154041.9, Response filed Oct. 6, 2009 to Extended European Search Report mailed Aug. 5, 2009", 9 pgs.

"European Application Serial No. 09154041.9, Second Office Action mailed Sep. 24, 2010", 7 pgs.

* cited by examiner

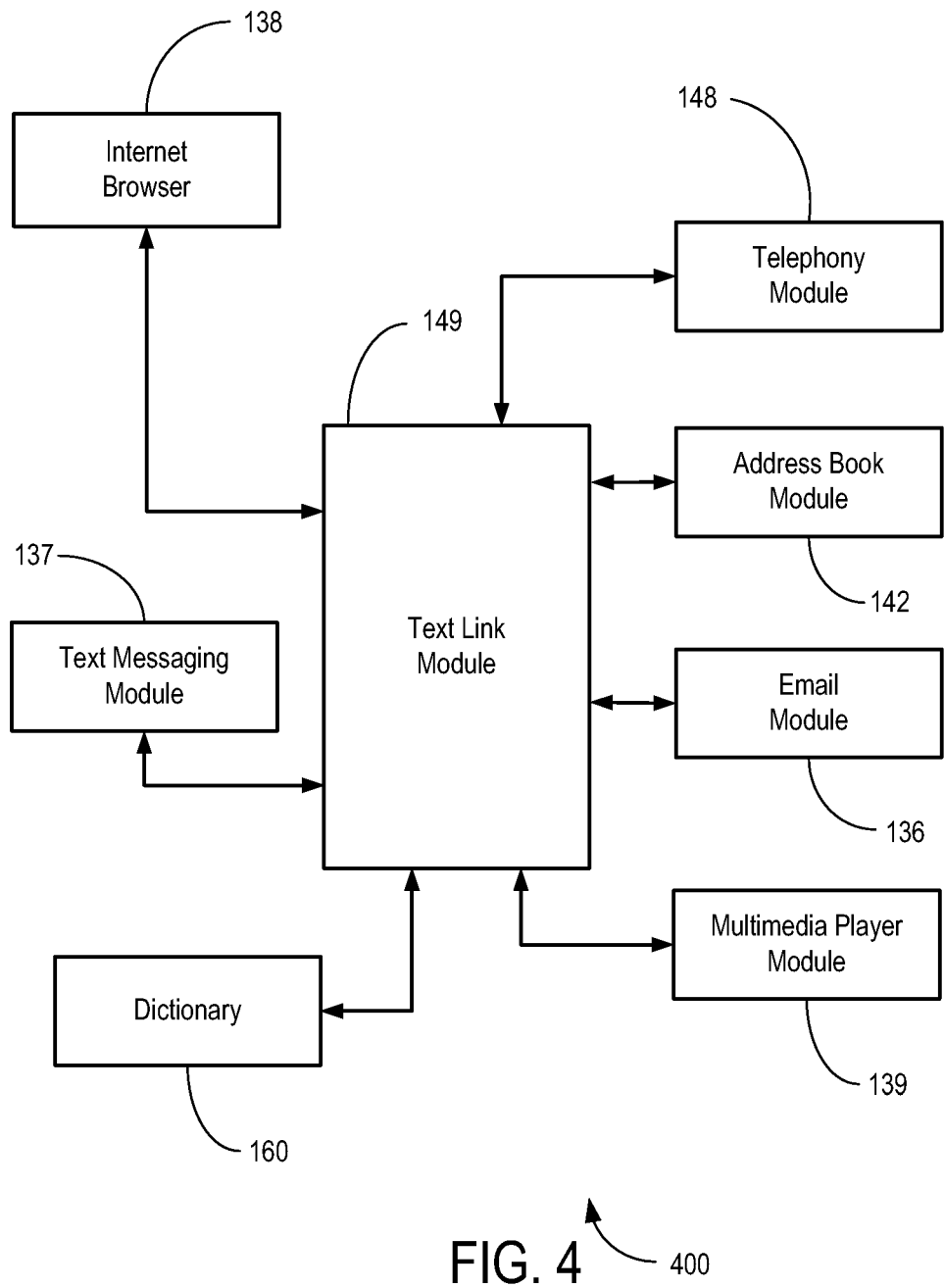
FIG. 4 — 400

SYSTEM AND METHOD FOR LINKING AD TAGGED WORDS

CROSS-REFERENCE TO RELATED APPLICATIONS

This application is a continuation of U.S. patent application Ser. No. 12/395,288 filed Feb. 27, 2009 (issued as U.S. Pat. No. 8,214,357), the content of which is incorporated herein by reference in its entirety.

FIELD OF THE DISCLOSURE

The present disclosure relates generally to telecommunications devices, and more particularly to linking advertising resource links to ad tagged words.

BACKGROUND

Some handheld mobile communication devices may provide the ability for users to tag keywords in a body of text. The tagged keyword may then be linked to a resource, such as a webpage associated with the tagged word. Selection of the tagged keyword may then direct a user to a resource associated with the keyword. For example, the resource may be an Internet webpage providing further information associated with the selected keyword.

BRIEF DESCRIPTION OF THE DRAWINGS

In the figures which illustrate exemplary embodiments:

FIG. 4 is a schematic block diagram of modules of a system in accordance with an embodiment;

DETAILED DESCRIPTION

The present disclosure relates to a system and method for linking advertising resource links to ad tagged words.

Figure 1:
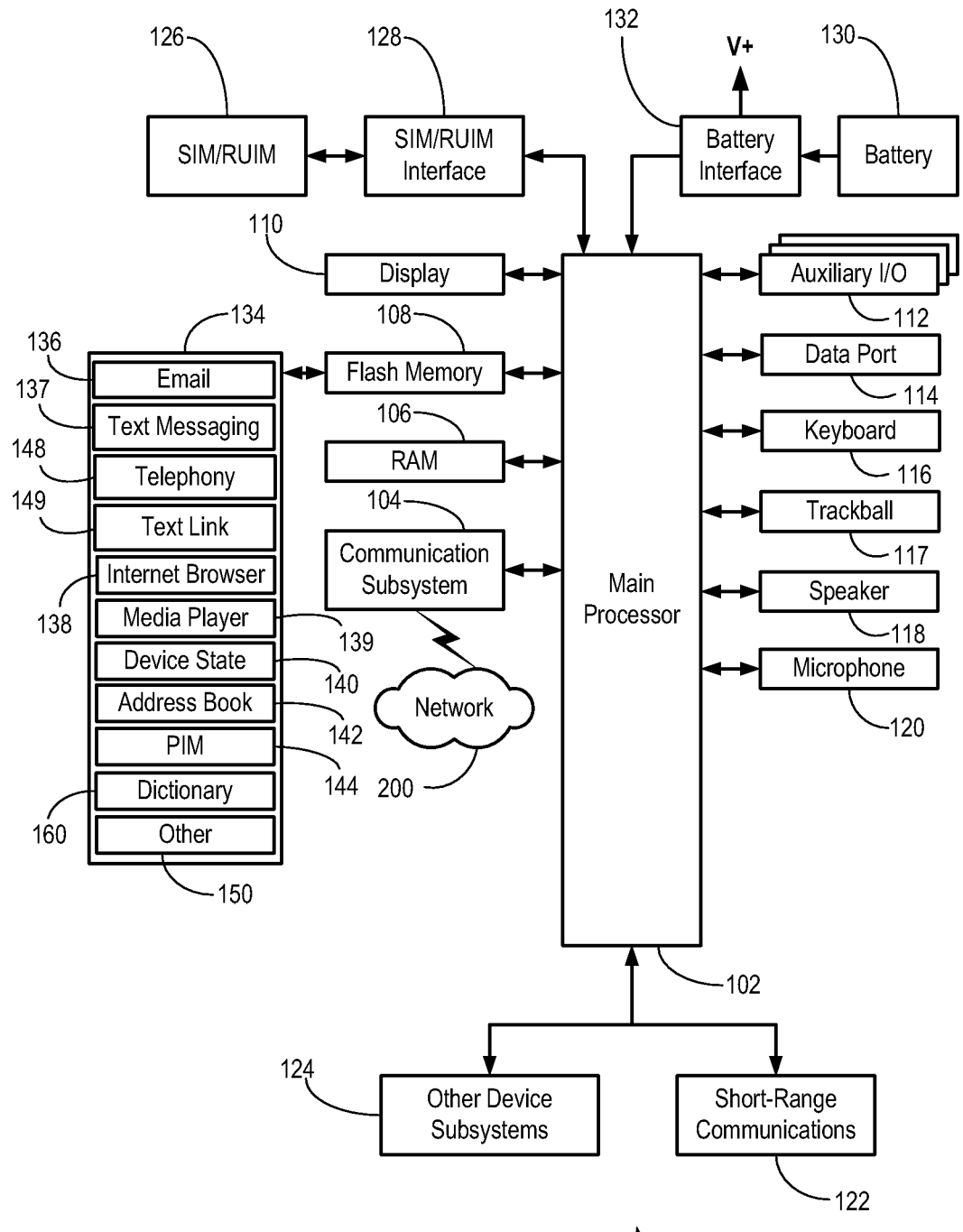
FIG. 1 is a schematic block diagram of various components of a communication device.

In an illustrative embodiment, the principles of the present disclosure may be practiced with a mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124. In some embodiments, the keyboard 116 may comprise a virtual keyboard or a physical keyboard or both. In some embodiments, the display 110 may comprise a touch screen display.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing the trackball to be depressed to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. In some embodiments, the communication device 100 may be solar powered or otherwise powered with or without use of a battery.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

Software applications 134 may include an email module 136. Email module 136 can be any suitable email software program that allows a subscriber or user of the communication device 100 to send and receive email communications. Various alternatives exist for the messaging application 136 as is well known to those skilled in the art. Messages that have been sent or received by device 100 are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

Software applications 134 may also include a text messaging module 137 for sending and receiving Short Message Service (SMS) text messages on device 100. Furthermore, software applications 134 may include a telephony module 148 for supporting various telephony functions on device 100, including various speed dialing functions such as speed dial keys, voice activated dialing, and/or short code dialing. Telephony module 148 may be operatively integrated with communication subsystem 104, keyboard 116, trackball 117, speaker 118, and microphone 120. Telephony module 148 may also be integrated with address book 142, e-mail module 136, text messaging module 137, Internet browser 138, RAM 106, flash memory 108 and display 110 to perform various other telephony functions on device 100.

Still referring to FIG. 1, software applications 134 may further include a text link module 149. Text link module 149 may be configured to scan a list or body of text (such as email message, a notepad application, an SMS message, a webpage, text extracted from a voice message, or any other text based application available on the mobile communication device) for one or more keywords and provide links to one or more resources for the one or more keywords. For example, one of the keywords may be visually distinguished by at least one of color, or font, or style (e.g. highlighting, flashing, etc.) and linked to an advertisement associated with the keyword. As another example, the highlighted words may be keywords linking related text. The text link module 149 is described in more detail further below.

The device 100 may further include a device state module 140, a Personal Information Manager (PIM) 144, a dictionary 160, and various other modules 150. Additional software applications may also be loaded onto the communication device 100 through at least one of the wireless network 200, the auxiliary I/O subsystem 112, the data port 114, the short-range communications subsystem 122, or other device subsystem 124. The short-range communications subsystem 122 may also provide a secondary communication channel for short-range communications, via Bluetooth™ or via Wi-Fi™, for example.

To identify a user, the communications device 100 may use a SIM/RUIM/USIM card 126 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 126 is one type of a conventional "smart card" that can be used to identify a user of the communications device 100 and to personalize the communications device 100, among other things. Without the SIM/RUIM/USIM card 126, the communications device 100 may not be fully operational for communication with the wireless network 200, in some embodiments. By inserting the SIM/RUIM/USIM card 126 into the SIM/RUIM/USIM interface 128, a user can access subscribed services. Such subscribed services may include, for example, web browsing and messaging such as email, voice mail, SMS, and Multimedia Messaging Services (MMS).

Figure 2:
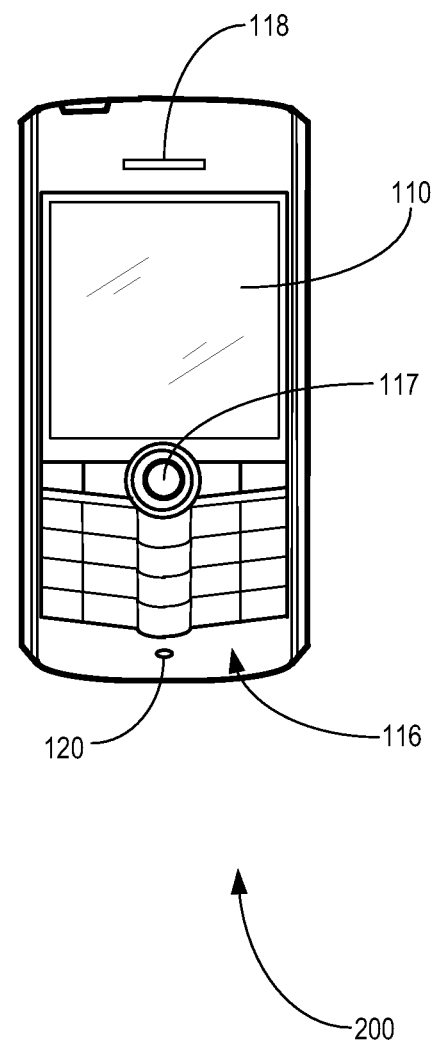
FIG. 2 is an illustrative front view of an embodiment of the communication device including the various components as shown in FIG. 1.

Now referring to FIG. 2, shown a handheld mobile communication device 200 corresponding to an illustrative embodiment of device 100 that may provide a suitable operating environment. As shown, the communication device 100 may include a display 110, a keyboard 116, and other input or navigation means such as a trackball 117. The display 110 may be configured to display various screens allowing the user of handheld mobile communication device 200 to view screen outputs from the various software applications 134, including the image applications 148. Display 110 may also be configured to provide a touch-sensitive screen input in response to a prompt or query displayed on display 110. Handheld mobile communication device 200 further includes an earpiece or speaker 118 and a microphone 120 in order to support the telephony functions previously described.

Figure 3:
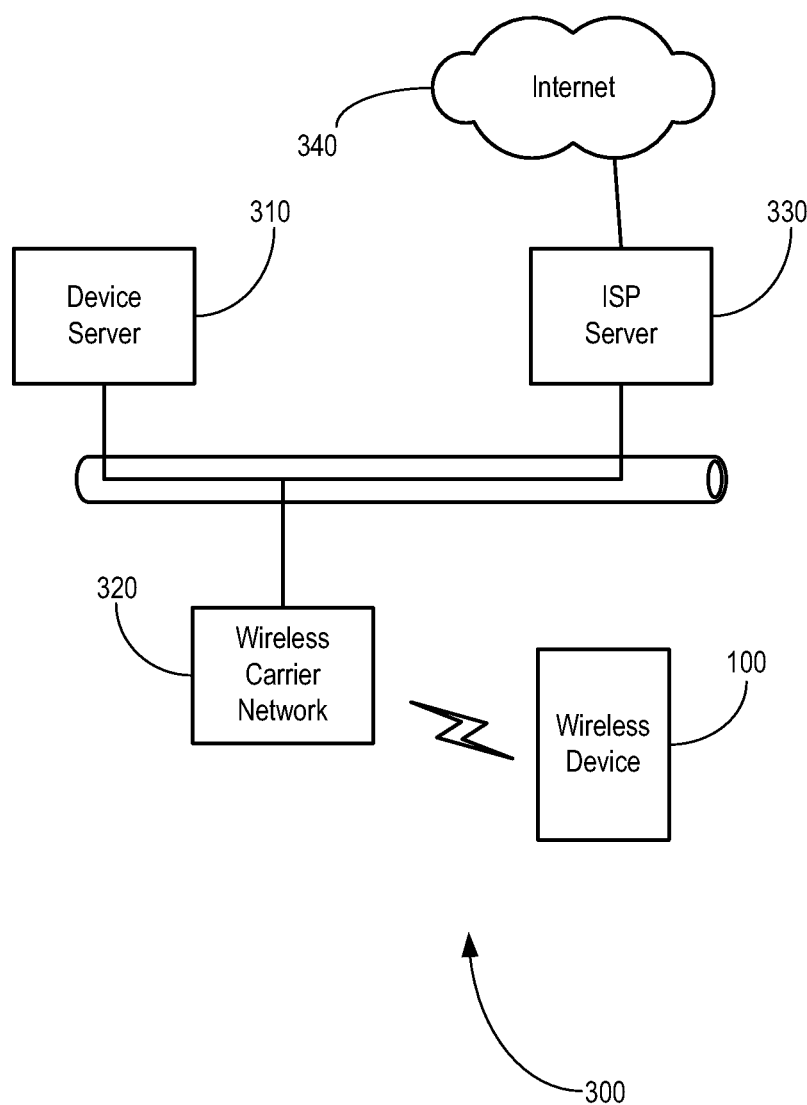
FIG. 3 is a schematic block diagram of a network environment in which the device of FIG. 1 may operate.

Now referring to FIG. 3, shown is a schematic block diagram of an illustrative network 300, which may provide a suitable operating environment. As shown, network 300 includes a device server 310 for hosting various server applications for device 100. Network 300 further includes a wireless carrier network 320 which provides wireless communications between device 100 and device server 310.

Still referring to FIG. 3, network 300 also includes an ISP server 330 which provides a connection to the Internet 340. With a suitable Internet browser module 138 provided on device 100, the device 100 may access the Internet 340 via the wireless carrier network 320, and the ISP server 330. Alternatively, a local Wi-Fi network (not shown) may be used to access the Internet 340 using short-range communications subsystem 122 (FIG. 1).

Now referring to FIG. 4, shown is a schematic block diagram of a system 400 in accordance with an embodiment. As shown in FIG. 4, access linking module 149 is operatively connected to e-mail module 136, text messaging module 137, Internet browser module 138, multimedia player module 139, address book module 142, telephony module 148, and dictionary 160.

In an embodiment, access linking module 149 may be configured to operate and interact with various modules (e.g. modules 136, 137, 138, 139, 142, 148) to access information or resources. For example, access linking module 149 may be integrated with Internet browser module 138 to access a webpage. As another example, text linking module 149 may be integrated with e-mail module 136 and text messaging module 137 to send or receive e-mail to/from a specific e-mail address or text messaging number. Text link module 149 may also be integrated with address book module 142 and telephony module 148 to dial certain contacts or resources and perform telephony functions with those contacts or resources.

Figure 5A:
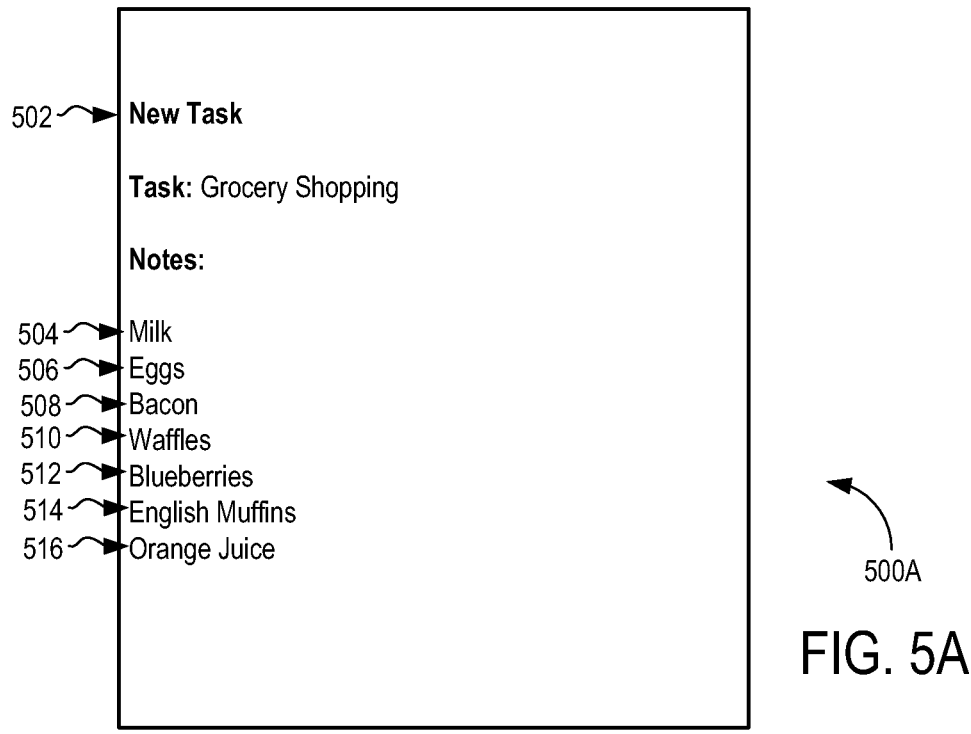
FIGS. 5A and 5B are illustrative examples of a user interface screen in accordance with an embodiment.

Now referring to FIG. 5A, shown is an illustrative user interface screen 500A, which may appear on display 110 of device 100 in accordance with an embodiment. As shown, screen 500A relates to a new task 502 entitled "Grocery Shopping". Screen 500A then lists a number of items 504 to 516 to purchase at the grocery.

In an embodiment, text linking module 149 is adapted to search the list of items 504 to 516 to determine if there are any tagged keywords appearing in the list. In the present context, the tagged keyword or keywords that may be associated with an advertising resource link are hereinafter interchangeably referred to as an "ad word" or "ad words". For example, text linking module 149 may first locate a keyword 510 for "Waffles". In this example, the keyword comprises an ad tagged word "Waffles". In an embodiment, if there is an offer associated with this ad word, then "Waffles" may be shown as highlighted or underlined text in the grocery shopping list, and may flash or otherwise visually indicate that there is an associated link to an advertising resource link. As well, the visual representation or treatment may be change further when there is another event trigger, such as an offer becoming available for a limited time. For example, if an ad word Nike™ is in the ad list, it may be always shown in bold or highlighted, but when a Nike product goes on sale, the ad word may flash or change color.

In an embodiment, the text linking module 149 may be adapted to allow any word appearing in a body of text to be tagged as an ad word, and then receive information relevant to the tagged word. For example, the ad word "Waffles" may be associated with a particular brand, such as Eggo™ Waffles. An ad word appearing in a list may also be edited and saved, such that the associated brand may change from Eggo Waffles to another brand if desired.

In another embodiment, an ad word may be linked to a particular location, such as a particular grocery chain. For example, the ad word "bread" may be linked to Safeway™ grocery stores, so that the word may be highlighted only when a special is available at the Safeway grocery store at which the user regularly shops. Later, a different grocery store may be associated with the ad word "bread", or may instead associate the ad word "bread" with a baker's brand name sold in a number of different grocery chains. Thus, it will be appreciated that the text linking module 149 may be adapted to freely add, delete, and modify ad words.

Upon detecting a clicking or rolling over of the ad word, more specific details may be shown for the advertising resource link. For example, clicking on the ad word may cause the device 100 to access a resource such as a website describing a branded product, or a purchase option screen for a product corresponding to the ad word. Alternatively, a number of other options or actions may be presented, such as "remind me later", "add to shopping list", "forward to friends", "save for <contact name>", "delete from Ad list", etc. Various illustrative examples will now be provided.

Figure 5B:
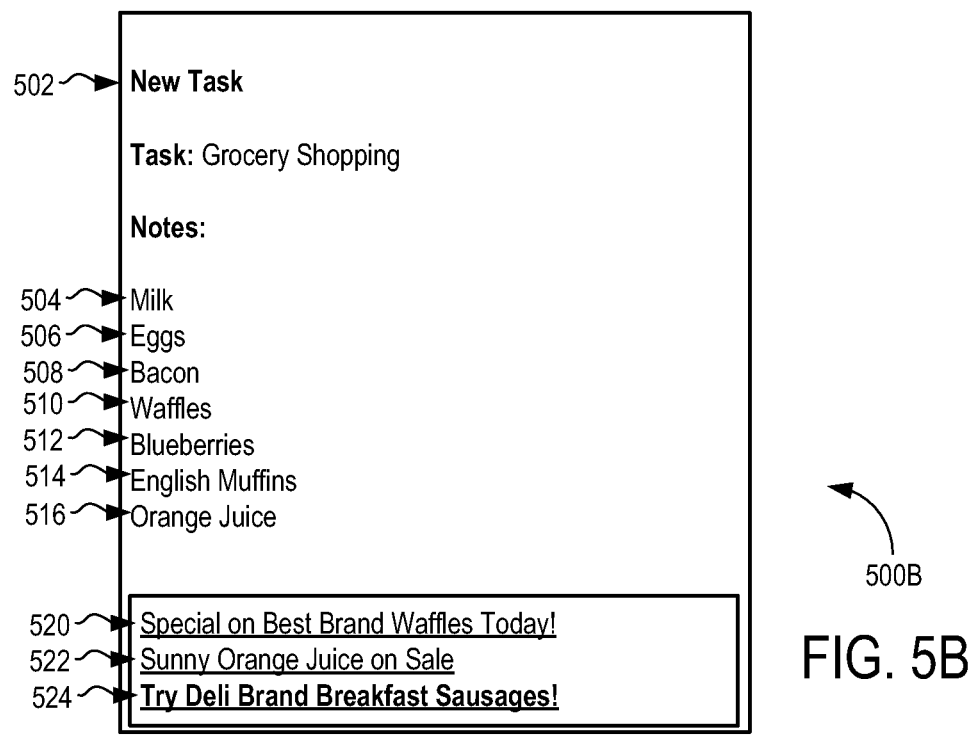

Referring to FIG. 5B, in response to locating a keyword 510 corresponding to an ad word, text linking module 149 may retrieve a resource, namely a first link 520 entitled "Special on Best Brand Waffles Today!". As another example, in response to locating another keyword 516 corresponding to an ad word for "Orange Juice", text linking module 149 may retrieve another resource, namely a second link 522 entitled "Sunny Orange Juice on Sale".

In another embodiment, based on the items 504 to 516 appearing in the list, text linking module 149 may be configured to retrieve a related link 524 entitled "Try Deli Brand Breakfast Sausages!" which doesn't have a corresponding keyword, but which text linking module 149 may associate with items 504 to 516 in the list, comprising mainly foods consumed for breakfast. Thus, in an embodiment, it is possible for the text linking module 149 to retrieve associated advertising links given a list of ad tagged words.

In an embodiment, links 520, 522 and 524 corresponding to ad tagged words may be visually distinguished to indicate accessibility only in response to device 100 being brought to a particular geographic location, such as a grocery store at which the advertised specials are available. For example, if device 100 is not in geographic proximity to the grocery store, then one or more of the links 520, 522 and 524 may not be visually distinguished to indicate accessibility. However, upon nearing or stepping into a store, the links 520, 522 and 524 may be visually distinguished to indicate that an advertising resource link is now accessible. Thus, an advertising resource link associated with an ad word may be triggered to be available upon the device 100 coming within a certain distance of a store. The availability of the advertising resource link may also be limited to a predetermined time span based on when the links were first triggered at a particular geographic location. For example, the presence or absence of a local Wi-Fi signal at a grocery store may determine whether or not resource links are available for a keyword appearing in screen 110 of device 100, and once triggered, the link may be time limited such that the link is made available for a limited amount of time. Upon expiry of accessibility, the visually distinguishing feature of the ad word may be removed.

In another embodiment, upon expiry of a time period, a message may be sent to the device 100 indicating that a "product" (i.e. an ad tagged word) is no longer available at this special price, and may display a prompt, asking whether to remove the ad word from the list or keep the ad word and receive future updates. Depending on the choice, the ad word may be removed or kept on the list to provide updates relating to this product.

Figure 5C:
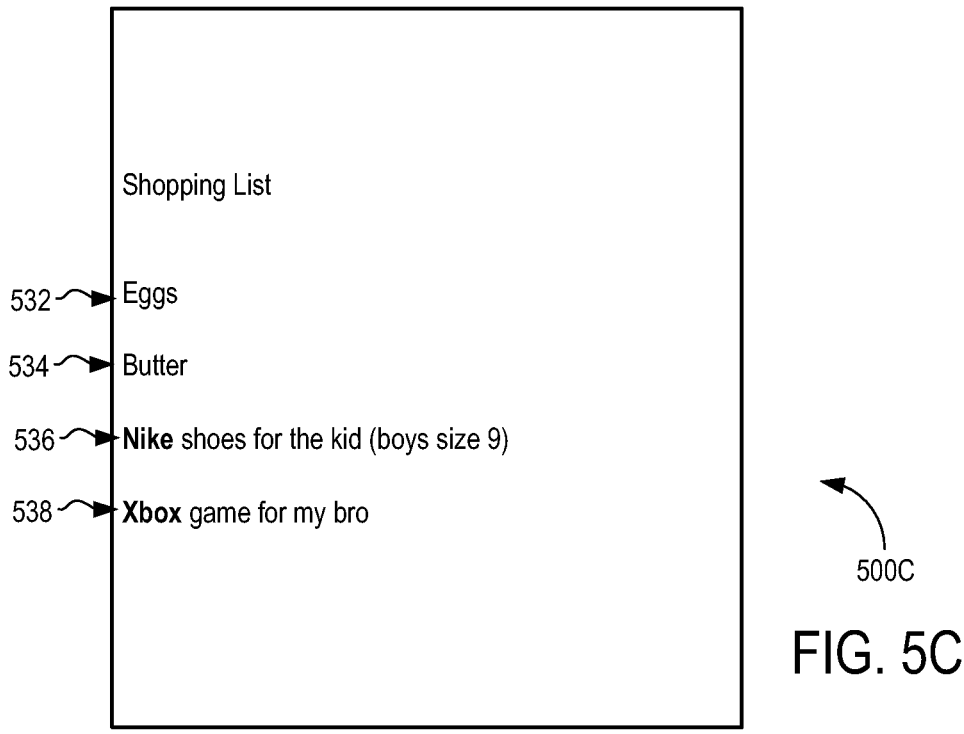
FIGS. 5C and 5D are illustrative examples of tagged keywords appearing in different text applications and linked to advertising resource links.
Figure 5D:
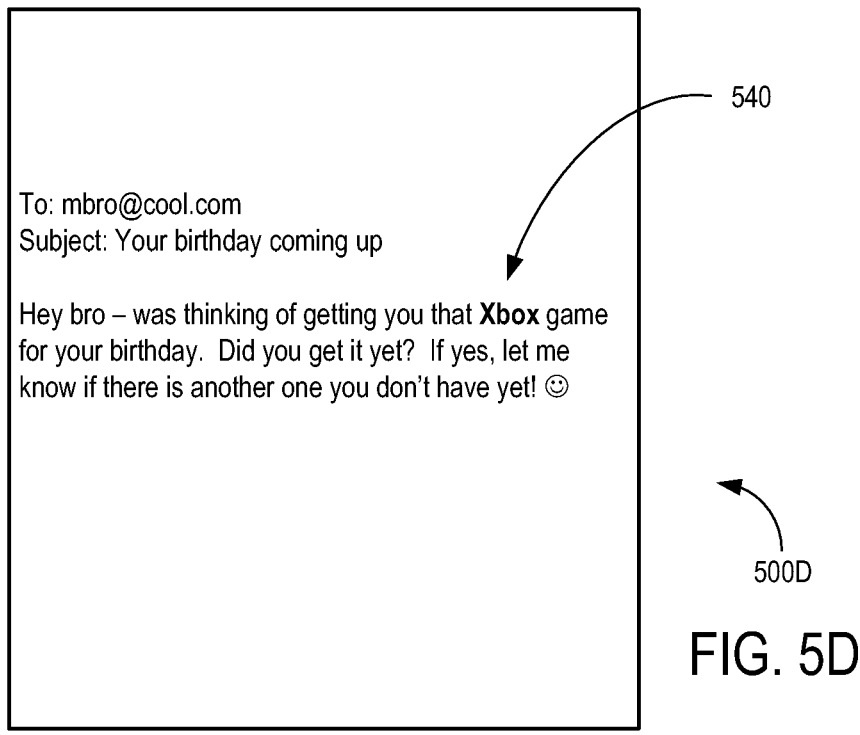

Now referring to FIG. 5C and FIG. 5D, shown is an illustrative example of how an ad word may appear in a number of different applications, such as a memo pad application 500C and an email application 500D. In this example, FIG. 5C shows a list of words as may appear in a shopping list, for example. The shopping list 500C includes a number of items 532 to 538, some of which are shown to contain highlighted ad words. That is, item 536 includes the ad word Nike shown in bold, and item 538 includes the ad word Xbox™ shown in bold. In the corresponding email message 500D, any ad word appearing in the shopping list 500C is also highlighted. In this illustrative example, the email 500D includes the ad word "Xbox" as well, which is highlighted and may be linked to a relevant ad. Similarly, any other text application associated with the ad list may also contain the same highlighted ad words. In this example, the ad word "Xbox" may be further distinguished by the words "my bro" appearing in the item. As will be described further below, other words appearing in the vicinity of an ad word may be used to further characterize or modify the ad associated with the ad word.

Figure 6A:
FIGS. 6A to 6F are illustrative examples of user interface screens in accordance with other embodiments.
Figure 6B:

Now referring to FIG. 6A and FIG. 6B, shown is another illustrative screen 600A displaying a title "Kitchen Renovations" at 602, and a text body at 604 to 618. In this illustrative example, a keyword input field may be provided at 622 for searching for an ad word as shown in screen 600B of FIG. 6B. Upon receiving entry of a keyword, instances of that keyword or ad word may be located and highlighted in the text body 604 to 618. The highlighted keyword or ad word in the text body 604 to 618 may then be linked to an associated webpage, such as an advertisement for a branded product corresponding to the highlighted ad word for example.

Figure 6C:
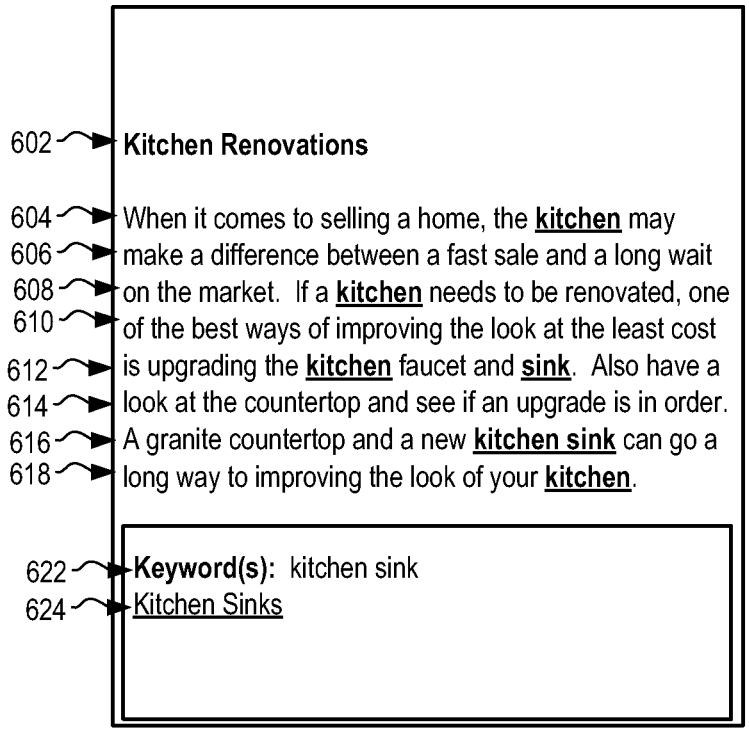

Now referring to FIG. 6C, shown is another illustrative screen 600C of the text previously shown in FIG. 6B but now with two keywords or ad words "kitchen" and "sink" both entered at input field 622. In response, the corresponding ad words in the text body at 604 to 618 may be highlighted. In this illustrative example, the keywords or ad words may be placed next to each other to form the compound ad word "kitchen sink". Alternatively, the keywords corresponding to ad words "kitchen" and "sink" may be separated by one or more words. In the latter case, text linking module 149 may be configured such that keywords located within a predetermined distance from each other (i.e. separated by X number of words or less, where X may be an integer) may form a virtual compound ad word. In the present example, in text line 612, the words "kitchen" and "sink" are separated by two intervening words "faucet" and "and". Assuming that X is set to 10, for example, this occurrence of "kitchen" and "sink" in sufficiently close distance from each other may result in the highlighting of both keywords, and a linking of both keywords as a virtual compound ad word. In an embodiment, text linking module 149 may be configured such that clicking on either one of the keywords in the virtual compound word will result in a link to an advertisement that is more specific or more refined to the compound ad word "kitchen sink".

As another example, consider a scenario where a person has written in an email to his brother that "I'd really like to have a pair of green Nikes for Christmas". In this note, "Nikes" would be identified as an ad word and could be highlighted or otherwise visually distinguished when a Nike sale or promotion is happening, and could further be visually distinguished (e.g. by flashing, changing colors, etc.) if the sale or promotion happens to be for green Nike shoes. When detecting a clicking or rolling over of this ad word, the device will display an ad for green Nike shoes on sale, in a pop-up window for example. The device may access a collection of this type of information, and may also provide a purchase window to make a purchase.

Figure 6D:
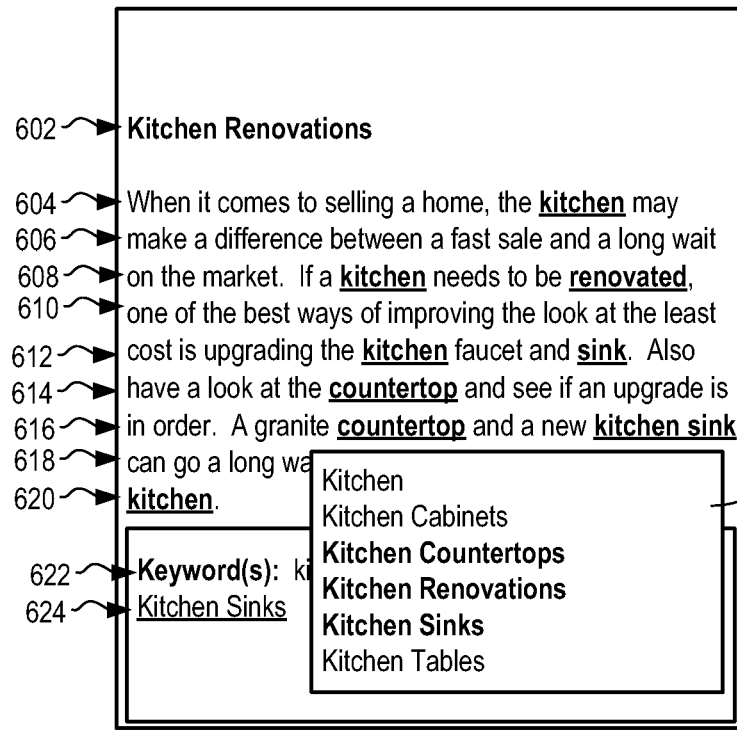

Now referring to FIG. 6D, in another embodiment, rather than relying on entry of specific keywords at input field 622, text linking module 149 may access dictionary 160 to perform automatic scans of the text body 604 to 620 for a primary keyword and related secondary keywords to form a compound ad word. In an embodiment, dictionary 160 may be configured to contain a list of common compound words containing a primary keyword and one or more secondary keywords. Shown by way of illustration in window 630 is a list of compound words that may be found in dictionary 160 containing "kitchen" as the primary keyword and a number of related secondary keywords. These compound ad words may include, for example, "Kitchen Cabinets", "Kitchen Renovations", "Kitchen Sinks" and "Kitchen Tables", etc. In this case, text linking module 149 may scan through the text body 604 to 620 to locate instances of these compound ad words, comprising a primary keyword and one or more secondary keywords separated by X number of words or less.

As shown by way of illustration in this example, text line 608 contains a virtual compound ad word "kitchen . . . renovated" (separated by X words or less, where X is 10 for example) and text line 616 contains virtual compound word "countertop . . . kitchen" (separated by X words or less, where X is 10 for example). In the first case, while "renovated" does not exactly match "renovations" in the compound word "Kitchen Renovations", text linking module 149 may be configured to access dictionary 160 in which similar words are recognized as being related. For example, "renovated" may be deemed to be related to "renovations" such that "kitchen . . . renovated" is recognized as being related to "Kitchen Renovations". In the second case of virtual compound ad word "countertop . . . kitchen", while the words appear in reverse order, text linking module 149 may be configured to recognize that "countertop . . . kitchen" is related to "Kitchen Countertops". As will be appreciated, by scanning the text body 604 to 620 for compound ad words or virtual compound ad words, more relevant links may be created by providing more specific information. Thus, for example, rather than providing links to every advertisement concerned with kitchens, only those advertisements relating to the compound words kitchen countertops and kitchen sinks may be linked to each compound word, respectively.

Figure 6E:
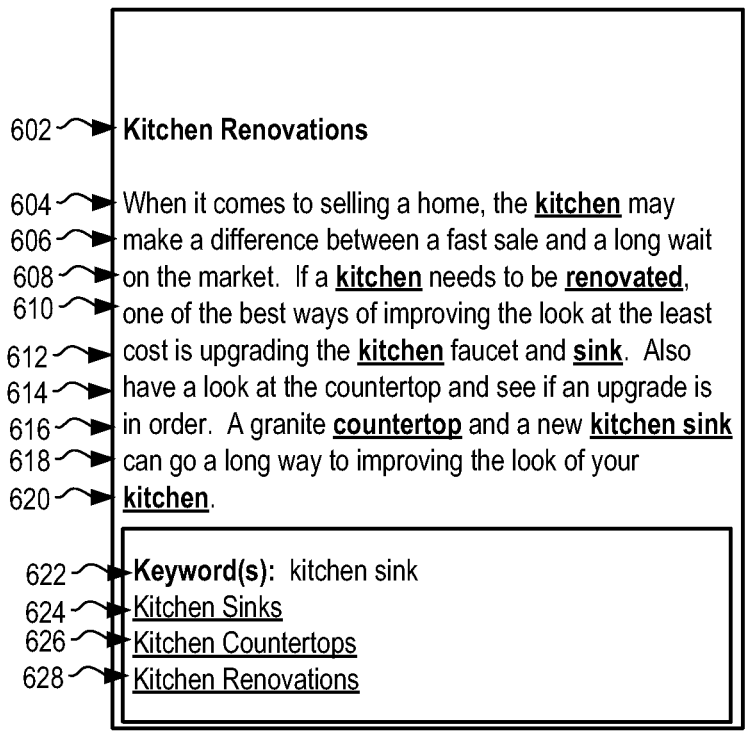
Figure 6F:
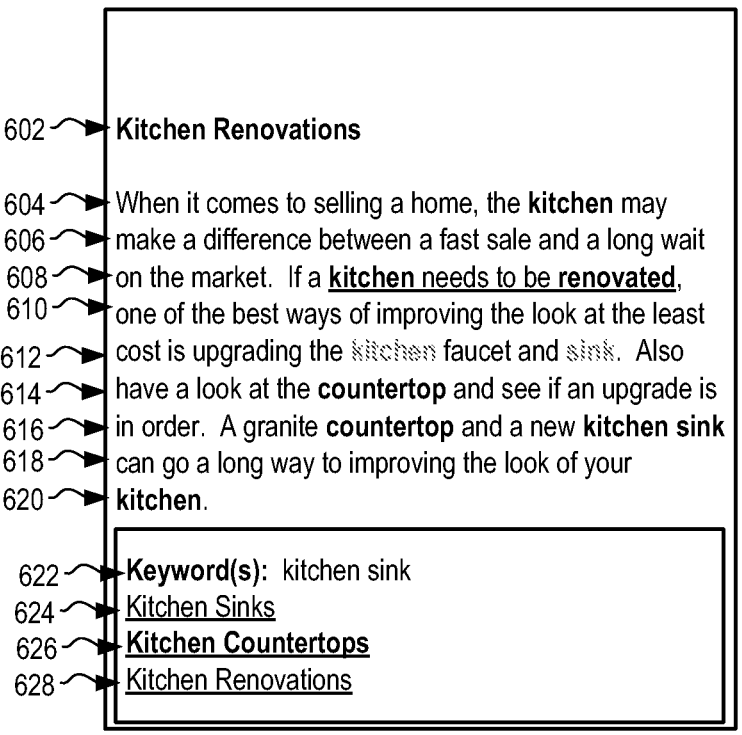

Now referring to FIG. 6E, shown is another illustrative example of a user interface screen 600E in which text linking module 149 has completed the scan of text body 605 to 620, and has identified new links 626, 628 related to "Kitchen Countertops" and "Kitchen Renovations", respectively. As shown in FIG. 6F, one of the displayed links "Kitchen Countertops" 626 may be selected in order to access a related website, or be provided with a screen option to purchase an associated item.

In an embodiment, instead of linking directly to a website or to a purchase option screen, other options may be made available, such as to "remind me later", "add to shopping list", "forward to friends", "save for <name's list>", "delete", etc.

In another embodiment, upon locating and forming a compound ad word, the compound ad word may be visually distinguished such that the primary and secondary keywords forming the compound ad word are paired together. For example, the primary and secondary keywords may be color coded to show that they are matched together, as shown in line 612. As another example, the primary and secondary keywords may be linked together by some other form of visual identification, such as by underlining running between the primary and secondary keywords, as shown in line 608. As will be appreciated, by visually linking together paired primary and secondary keywords forming a compound ad word, it is made easier to identify and understand the resource link that is associated with the compound ad word.

Figure 7:
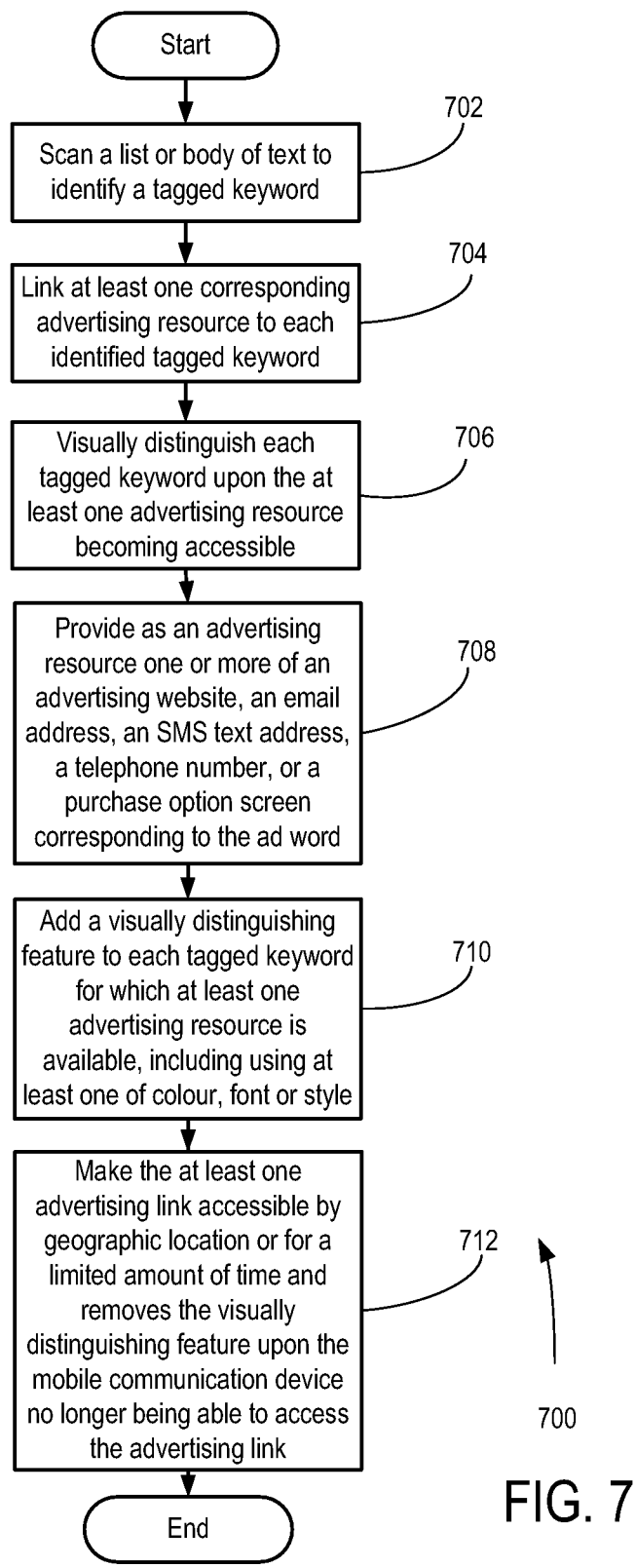
FIG. 7 is a schematic flow chart of a method in accordance with an embodiment.

Now referring to FIG. 7, shown is a schematic flowchart of a method 700 in accordance with an embodiment. As shown, method 700 begins and at block 702 method 700 scans a list or a body of text in order to identify an ad word or tagged keyword. In an embodiment, scanning the list or body of text comprises scanning at least one of an email message, a notepad application, an SMS message, a webpage, text extracted from a voice message, or any other text based application available on the mobile communication device. As well, a keyword search field may be provided to locate and tag one or more tagged keywords in the list or body of text.

Next, at block 704, method 700 links at least one corresponding advertising resource link to each identified tagged keyword.

Next, at block 706, method 700 visually distinguishes each tagged keyword upon the at least one advertising resource link associated with the tagged keyword becoming accessible to the mobile communication device 100.

Next, at block 708, method 700 provides as an advertising resource link at least one of an advertising website, an email address, an SMS text address, a telephone number, or a purchase option screen corresponding to the identified tagged keyword.

Next, at block 710, method 700 adds a visually distinguishing feature to each tagged keyword for which at least one advertising resource link is available including using at least one of color, or font, or style.

Next, at block 712, method 700 makes the at least one advertising link accessible in dependence upon the geographic location of the mobile communication device or for a limited amount of time, and removes the visually distinguishing feature upon the mobile communication device no longer being able to access the advertising link.

Figure 8:
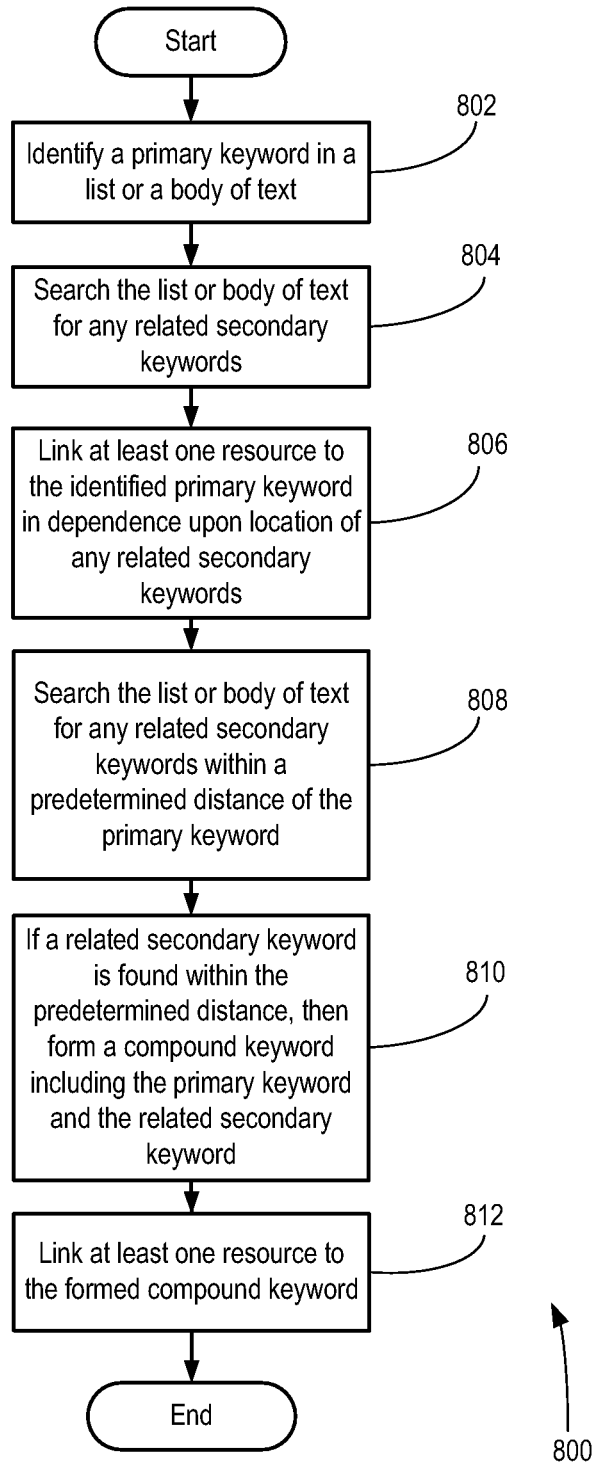
FIG. 8 is a schematic flow chart of a method in accordance with another embodiment.

Now referring to FIG. 8, shown is a schematic flowchart of a method 800 in accordance with another embodiment. As shown, method 800 begins and at block 802 method 800 identifies a primary keyword or tagged keyword in a list or a body of text. Method 800 then proceeds to block 804 where method 800 searches the list or body of text for any related to secondary keywords.

Method 800 then proceeds to block 806 where method 800 links at least one resource to the identified primary keyword in dependence upon location of any related secondary keywords.

Method 800 then proceeds to block 808 where method 800 searches the list or body of text for any related secondary keywords within a predetermined distance of the primary keyword.

Method 800 then proceeds to block 810, where if a related secondary keyword is found within the predetermined distance, then method 800 forms a compound word including the primary keyword and the related secondary keyword.

Method 800 then proceeds to block 812 where method 800 links at least one resource to the formed compound word. Method 800 then ends.

Thus, in an aspect, there is provided a computer-implemented method operable on a mobile communication device for linking words to advertising resource links, the method comprising: scanning a list or a body of text in order to identify a tagged keyword; linking at least one corresponding advertising resource link to each identified tagged keyword; and visually distinguishing the tagged keyword upon the at least one advertising resource link becoming accessible to the mobile communication device.

In an embodiment, the method further comprises providing as an advertising resource link one or more of an advertising website, an email address, an SMS text address, a telephone number, or a purchase option screen corresponding to the identified tagged keyword.

In another embodiment, the method further comprises adding a visually distinguishing feature to the ad including using at least one of color, or font, or style.

In another embodiment, the method further comprises: making the at least one advertising link accessible in dependence upon the geographic location of the mobile communication device; and removing the visually distinguishing feature upon the mobile communication device no longer being able to access the advertising link.

In another embodiment, the method further comprises: making the at least one advertising link accessible for a limited amount of time; and removing the visually distinguishing feature upon the mobile communication device no longer being able to access the advertising link.

In another embodiment, scanning the list or body of text comprises scanning at least one of an email message, a notepad application, an SMS message, a webpage, text extracted from a voice message, or any other text based application available on the mobile communication device.

In another embodiment, the method further comprises providing a keyword search field to locate and tag one or more tagged keywords in the list or body of text.

In another embodiment, the method further comprises providing a list of selectable options upon a tagged keyword being selected or rolling over.

In another embodiment, the selectable options include one or more of deleting, amending, saving or forwarding a tagged keyword.

In another embodiment, the method further comprises providing means to assign any word in a body of text as an ad tagged word.

In another aspect, there is provided a mobile communications device having an application module adapted for linking words to advertising resource links, the application module comprising: means for scanning a list or a body of text in order to identify a tagged keyword; means for linking at least one corresponding advertising resource link to each identified tagged keyword; and means for visually distinguishing a tagged keyword upon the at least one advertising resource link becoming accessible to the mobile communication device.

In an embodiment, the device further comprises means for providing as an advertising resource link at least one of an advertising website, an email address, an SMS text address, a telephone number, or a purchase option screen corresponding to the identified tagged keyword.

In another embodiment, the device further comprises means for adding a visually distinguishing feature to the ad including using at least one of color, or font, or style.

In another embodiment, the device further comprises: means for making the at least one advertising link accessible in dependence upon the geographic location of the mobile communication device; and means for removing the visually distinguishing feature upon the mobile communication device no longer being able to access the advertising link.

In another embodiment, the device further comprises: means for making the at least one advertising link accessible for a limited amount of time; and means for removing the visually distinguishing feature upon the mobile communication device no longer being able to access the advertising link.

In another embodiment, the means for scanning the list or body of text is adapted to scan one or more of an email message, a notepad application, an SMS message, a webpage, text extracted from a voice message, or any other text based application available on the mobile communication device.

In another embodiment, the device further comprises a keyword search field to locate and tag one or more tagged keywords in the list or body of text.

In another embodiment, the device further comprises means for providing a list of selectable options upon a tagged keyword being selected or rolling over.

In another embodiment, the selectable options include one or more of adding, deleting, amending, saving or forwarding the tagged keyword.

In another embodiment, the device further comprises means to assign any word in a body of text as an ad tagged word.

In another aspect, there is provided a computer readable medium storing computer code that when loaded into a mobile communication device adapts the device to perform a method for linking words to advertising resource links, the computer readable medium comprising: code for scanning a list or a body of text in order to identify a tagged keyword; code for linking at least one corresponding advertising resource link to each identified tagged keyword; and code for visually distinguishing the tagged keyword upon the at least one advertising resource link becoming accessible to the mobile communication device.

While illustrative embodiments have been described above, it will be appreciated that various changes and modifications may be made. More generally, the scope of the invention is defined by the following claims.

What is claimed is:

1. A method for providing advertisement on a mobile communication device, the method comprising:
   identifying, at the mobile communication device, a primary keyword in a list or a body of text;
   identifying at least one secondary keyword in the list or the body of text, the at least one secondary keyword located within a predetermined distance of the primary keyword and being related to the primary keyword;
   in response to identifying the at least one secondary keyword, forming a compound keyword comprising the primary keyword and the at least one secondary keyword;
   associating at least one advertising resource link to the formed compound keyword; and
   visually distinguishing the formed compound keyword by applying a visually distinguishing feature.

2. The method of claim 1, wherein the identifying of the primary keyword and the identifying of the at least one secondary keyword comprise automatically scanning the list or the body of text to determine the compound keyword.

3. The method of claim 1, wherein the identifying of the primary keyword and the identifying of the at least one secondary keyword comprise receiving user input of the primary keyword and the at least one secondary keyword.

4. The method of claim 1, further comprising providing the at least one advertising resource link, the advertising resource link comprising one or more of an advertising website, an email address, an SMS text address, a telephone number, or a purchase option screen corresponding to the formed compound keyword.

5. The method of claim 1, wherein the visually distinguishing feature comprises at least one of color, font, or style.

6. The method of claim 1, wherein the visually distinguishing feature is applied to the formed compound keyword for a limited amount of time, and the method further comprising removing the visually distinguishing feature from the formed compound keyword when the limited amount of time has elapsed.

7. The method of claim 1, wherein the visually distinguishing feature is applied to the formed compound keyword in response to detecting that a physical location of the mobile communication device is proximate to a geographic location associated with the at least one advertising resource link, and the method further comprising removing the visually distinguishing feature from the formed compound keyword when the physical location of the mobile communication device is no longer proximate to the geographic location associated with the at least one advertising resource link.

8. The method of claim 1, wherein the list or the body of text comprises at least one of an email message, a notepad application, an SMS message, a webpage, text extracted from a voice message, or any other text based application available on the mobile communication device.

9. A mobile communication device, comprising:
a display configured to display a list or a body of text; and
a processor in communication with the display, the processor configured to identify a primary keyword in the list or the body of text, identify at least one secondary keyword in the list or the body of text, form a compound keyword comprising the primary keyword and the at least one secondary keyword in response to identifying the at least one secondary keyword, and associate at least one advertising resource link to the compound keyword, wherein the display is further configured to visually distinguish the compound keyword by applying a visually distinguishing feature, and wherein the at least one secondary keyword is located within a predetermined distance of the primary keyword and is related to the primary keyword.

10. The mobile communication device of claim 9, further comprising an input means in communication with the processor, the input means configured to receive identification of the primary keyword and the at least one secondary keyword from a user.

11. The mobile communication device of claim 10, wherein the input means comprises a touch screen of the display.

12. The mobile communication device of claim 9, wherein the processor is configured to automatically scan the list or the body of text to identify the primary keyword and the at least one secondary keyword.

13. The mobile communication device of claim 9, wherein the processor is configured to apply the visually distinguishing feature to the compound keyword for a limited amount of time and to remove the visually distinguishing feature from the compound keyword when the limited amount of time has elapsed.

14. The mobile communication device of claim 9, wherein the processor is configured to apply the visually distinguishing feature to the compound keyword in response to detection of a physical location of the mobile communication device being proximate to a geographic location associated with the at least one advertising resource link, and to remove the visually distinguishing feature from the compound keyword when the physical location of the mobile communication device is no longer proximate to the geographic location associated with the at least one advertising resource link.

15. The mobile communication device of claim 9, wherein the display is configured to display the at least one advertising resource link, and wherein the advertising resource link comprises one or more of an advertising website, an email address, an SMS text address, a telephone number, or a purchase option screen corresponding to the compound keyword.

16. The mobile communication device of claim 15, wherein the display is configured to display the at least one advertising resource link in response to detection of a physical location of the mobile communication device being proximate to a geographical location associated with the at least one advertising resource link, and to remove the display of the at least one advertising resource link in response to detection of the physical location of the mobile communication device no longer being proximate to the geographical location associated with the at least one advertising resource link.

17. A non-transitory computer readable medium including instructions, when executed by a processor of a mobile communication device, causes the processor to perform operations comprising:
identifying a primary keyword in a list or a body of text;
identifying at least one secondary keyword in the list or the body of text, the at least one secondary keyword located within a predetermined distance of the primary keyword and being related to the primary keyword;
in response to identifying the at least one secondary keyword, forming a compound keyword comprising the primary keyword and the at least one secondary keyword;
associating at least one advertising resource link to the compound keyword; and
visually distinguishing the compound keyword by applying a visually distinguishing feature.

18. The non-transitory computer readable medium of claim 17, wherein the identifying of the primary keyword and the identifying of the at least one secondary keyword comprise automatically scanning the list or the body of text to determine the compound keyword.

19. The non-transitory computer readable medium of claim 17, wherein the identifying of the primary keyword and the identifying of the at least one secondary keyword comprise receiving user input of the primary keyword and the at least one secondary keyword.

20. The non-transitory computer readable medium of claim 17, further comprising selectively providing the at least one advertising resource link in response to a time period or a physical location of the mobile communication device coinciding with a condition associated with the at least one advertising resource link.

* * * * *